United States Patent
Norefors et al.

(10) Patent No.: US 8,670,342 B2
(45) Date of Patent: Mar. 11, 2014

(54) METHODS AND ARRANGEMENTS IN A WIRELESS COMMUNICATION NETWORK FOR HANDLING AT LEAST ONE PRIMARY TRACKING AREA

(75) Inventors: Arne Norefors, Stockholm (SE); Tomas Nylander, Värmdö (SE); Johan Rune, Lidingö (SE); Jari Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 132 days.

(21) Appl. No.: 13/140,262

(22) PCT Filed: May 8, 2009

(86) PCT No.: PCT/SE2009/050508
§ 371 (c)(1),
(2), (4) Date: Jun. 16, 2011

(87) PCT Pub. No.: WO2010/071545
PCT Pub. Date: Jun. 24, 2010

(65) Prior Publication Data
US 2011/0261715 A1 Oct. 27, 2011

Related U.S. Application Data

(60) Provisional application No. 61/138,274, filed on Dec. 17, 2008.

(51) Int. Cl.
*H04B 7/14* (2006.01)
*H04J 3/08* (2006.01)
*H04L 12/16* (2006.01)

(52) U.S. Cl.
USPC ............ 370/252; 370/259; 370/315; 455/458

(58) Field of Classification Search
USPC .......... 370/331–338, 259–328; 455/404–414, 455/456–458
See application file for complete search history.

(56) References Cited

U.S. PATENT DOCUMENTS

| | | | |
|---|---|---|---|
| 6,546,255 B1 | 4/2003 | Cerwall et al. | |
| 7,974,228 B2 * | 7/2011 | Bosch et al. | 370/315 |
| 8,095,156 B2 * | 1/2012 | Iwamura | 455/457 |

(Continued)

FOREIGN PATENT DOCUMENTS

| | | |
|---|---|---|
| EP | 1916857 A1 | 4/2008 |
| EP | 1978770 A1 | 10/2008 |

(Continued)

*Primary Examiner* — M. Phan
(74) *Attorney, Agent, or Firm* — Coats and Bennett PLLC

(57) ABSTRACT

A method and arrangement in a data collection network node (130, 140) for gathering information to be used for identification of at least one primary tracking area associated with a user equipment and a method and arrangement in a core network node (101) for selecting at least one tracking area identity identifying at least one tracking area to be used as at least one primary tracking area for a UE are provided. A tracking area identity is retrieved. Information about usage of a tracking area identified by the retrieved tracking area identity is registered. A measure for the user equipment being located in the tracking area is determined. Said at least one tracking area identity identifying at least one tracking area to be used as a primary tracking area is determined, if the measure exceeds a threshold. A method and an arrangement in a second network node (130) for paging a user equipment are provided. When paging the user equipment (140), the second network node first pages the user equipment (140) in the primary tracking area and, if the first page fails, then pages the user equipment (140) in other tracking areas.

23 Claims, 5 Drawing Sheets

(56) References Cited

U.S. PATENT DOCUMENTS

| | | | |
|---|---|---|---|
| 8,320,290 B2* | 11/2012 | Chao et al. ........... | 370/312 |
| 2008/0020745 A1 | 1/2008 | Bae et al. | |
| 2008/0090593 A1* | 4/2008 | Jen ....................... | 455/458 |
| 2008/0220782 A1 | 9/2008 | Wang et al. | |
| 2008/0268842 A1* | 10/2008 | Herrero-Veron ....... | 455/435.1 |
| 2008/0268878 A1 | 10/2008 | Wang et al. | |
| 2009/0122727 A1* | 5/2009 | Gan et al. .............. | 370/259 |
| 2010/0029277 A1* | 2/2010 | Ekstrom et al. ....... | 455/436 |
| 2010/0075698 A1* | 3/2010 | Rune et al. ............ | 455/458 |
| 2010/0105377 A1* | 4/2010 | Iwamura et al. ....... | 455/424 |
| 2010/0120448 A1 | 5/2010 | Iwamura et al. | |
| 2011/0060837 A1* | 3/2011 | Zhai et al. ............. | 709/227 |
| 2011/0210845 A1* | 9/2011 | Xiong et al. ........... | 340/539.13 |
| 2011/0263267 A1* | 10/2011 | Klatt et al. ............ | 455/456.1 |

FOREIGN PATENT DOCUMENTS

| | | |
|---|---|---|
| JP | 2002533037 A | 10/2002 |
| JP | 2008193365 A | 8/2008 |
| WO | 2008/088258 A1 | 7/2008 |

* cited by examiner

METHODS AND ARRANGEMENTS IN A WIRELESS COMMUNICATION NETWORK FOR HANDLING AT LEAST ONE PRIMARY TRACKING AREA

TECHNICAL FIELD

The present invention relates to methods and arrangements for setting up and/or using at least one primary tracking area, more particularly to a method and an arrangement in a core network node for selecting at least one tracking area to be used as at least one primary tracking area, a method and an arrangement in a data collection network node for gathering information to be used for identification of at least one primary tracking area, and a method and an arrangement in a second network node for paging a user equipment.

BACKGROUND

Registrations of current (location/routing/tracking) area are used to inform the cellular network where the mobile subscriber currently is attached. This information is used to limit the number of cells used for paging of the subscriber user equipment (UE). Without registrations all cells must be paged, the latter approach does not scale. On the other hand the registrations cause signaling load as well. This means that the network must be configured to balance between registration and paging load.

The $3^{rd}$ Generation Partnership Project for Evolved Packet System (3GPP EPS or System Architecture Evolution/Long Term Evolution, SAE/LTE) system introduces the possibility to provide the user equipment with individual information (a so-called Tracking Area (TA) list which can include multiple tracking area identities (TAIs)) on when to register to the network. The network will page the user equipment in all the Tracking Areas that are on the TA list. Thus, as long as the user equipment moves between the Tracking Areas on the TA list, it does not need to notify the network of its new location (e.g. by performing a Tracking Area Update). Note that this list of TAIs is sometimes referred to as a TA list and sometimes referred to as a TAI list. A mobility management entity (MME) can allocate a new TA list to a user equipment in conjunction with some EMM (EPS Mobility Management) procedures like Attach, Tracking Area Update (TAU) and GUTI (Global Unique Temporary Identity) Reallocation. Note that although a GUTI Reallocation procedure normally is performed in conjunction with another mobility management procedure, e.g. as part of a TAU or Attach procedure, it can in principle be performed any time while the user equipment is in EMM-REGISTERED state (i.e. when there is an EMM context in the UE). This means that an MME may allocate a new TA list to a user equipment any time while the user equipment is in EMM-REGISTERED state.

Too much signaling, both for registrations (tracking area updates) and paging causes system signaling load. Therefore, there is a need for finding solutions to reduce the signaling load in the network. If the signaling load is reduced also cost for network nodes are reduced.

SUMMARY

An object of the present invention is to provide methods and arrangements for reducing load in a wireless communication network due to tracking area update requests and/or paging.

According to an aspect of the present invention, the object is achieved by a method in a data collection network node, such as a mobility management entity or a user equipment, for gathering information to be used for identification of at least one primary tracking area associated with a user equipment. A wireless communication network, such as an EPS network, comprises the data collection network node. In a step, the data collection network node retrieves a tracking area identity. In another step, the data collection network node registers information about usage of a tracking area identified by the retrieved tracking area identity.

According to another aspect of the present invention, the object is achieved by an arrangement in a data collection network node for gathering information to be used for identification of at least one primary tracking area associated with a user equipment. A wireless communication network, such as an EPS network, comprises the data collection network node. The arrangement comprises a retrieving unit configured to retrieve a tracking area identity, preferably from (or in conjunction with) a service or tracking area update request or a page response, each one of the service or tracking area update request or the page response being sendable or received by the data collection network node. Furthermore, the arrangement comprises a registration unit (or a processing unit) configured to register information about usage of a tracking area identified by the retrieved tracking area identity.

According to a further aspect of the present invention, the object is achieved by a method in a core network node, such as a Home Subscriber Server or a Mobility Management Entity, for selecting at least one tracking area identity to be used as at least one primary tracking area for a user equipment. A wireless communication network comprises the core network node and the user equipment. In a step, the core network node retrieves information about at least one tracking area for the user equipment. In another step, the core network node determines a measure for the user equipment being located in the at least one tracking area. The measure is based on one or more of probability for receiving a page response from the user equipment if the user equipment is located in the tracking area, time spent by the user equipment in the tracking area and tracking area border crossings by the user equipment. In another step, the core network node selects said at least one tracking area identity to be used as a primary tracking area, if the measure exceeds a threshold.

According to yet another aspect of the present invention, the object is achieved by an arrangement in a core network node, such as an HSS (Home Subscriber Server) or an MME, for selecting at least one tracking area identity to be used as at least one primary tracking area for a user equipment. A wireless communication network comprises the core network node and the user equipment. The arrangement comprises a retrieving unit or a receiving unit configured to retrieve information about a tracking area for the user equipment. Furthermore, the arrangement comprises a processing unit, or a determination unit, configured to determine a measure for the user equipment being located in the tracking area, wherein the measure is based on one or more of probability for receiving a page response from the user equipment if the user equipment is located in the tracking area, time spent by the user equipment in the tracking area and tracking area border crossings by the user equipment. The processing unit is further configured to select (or identify) said at least one tracking area identity to be used as a primary tracking area, if the measure exceeds a first threshold.

According to a still further aspect of the present invention, the object is achieved by a method in a second network node, such as a mobility management entity, for paging a user equipment. The second network node manages a list of tracking area identities, wherein the list comprises at least one tracking area identity for identifying at least one primary tracking area. Each one of the tracking areas identified by said tracking area identities and said at least one primary tracking area is associated with at least one cell served by a third radio network node. The third radio network node is managed by the second network node. A wireless communication network comprises the second network node, the third radio network node and the user equipment. In a step, the second network node pages the user equipment in at least one cell associated with said at least one primary tracking area. If no response, trigged by the step of paging the user equipment in said at least one cell associated with said at least one primary tracking area, is received from the user equipment, then the second network node pages the user equipment in cells associated with a set of tracking area identities selected among the tracking area identities in the list of tracking area identities.

According to a yet further aspect of the invention, the object is achieved by an arrangement in a second network node, such as an MME, for paging a user equipment. The second network node manages a list of tracking area identities, wherein the list comprises at least one tracking area identity for identifying at least one primary tracking area. Each one of the tracking areas identified by said tracking area identities and said at least one primary tracking area identity is associated with at least one cell served by a third radio network node. The third radio network node is managed by the second network node. The wireless communication network comprises the second network node, the third radio network node and the user equipment. The arrangement comprises a paging unit (or a processing unit) configured to page the user equipment in at least one cell associated with said at least one primary tracking area identity. Moreover, the paging unit may further be configured to, if no response, trigged by the paging of the user equipment in said at least one cell associated with said at least one primary tracking area identify, is received from the user equipment, page the user equipment in cells associated with a set of tracking area identities. The set of tracking area identities are selected among the tracking area identities in the list of tracking area identities.

An idea of the present invention is to use long-term or semi-long-term statistics to identify and select at least one tracking area which has a special "status", hereinafter referred to as primary tracking area or primary tracking area identifier. Said at least one primary tracking area may be utilized in especially beneficial ways when the user equipment is located inside or near this primary tracking area (or these primary tracking areas). A tracking area selection occasion is when the user equipment needs a new tracking area list from the network due to for example movements or power on of the user equipment. Hence, the present solution calculates data structures, such as in the shape of at least one primary tracking area, independently of tracking area selection occasions, which data structures may be used and repeatedly reused during tracking area selection occasions.

Since the primary tracking area indicates a tracking area in which the user equipment may be located, preferably located in that tracking area by a relatively high probability, a page for the user equipment in the primary tracking area will most likely result in a positive page response. Usage information about the primary tracking area for a user equipment may be gathered by a data collection network node, such as an mobility management entity or a user equipment. The selection of the primary tracking area is based on the gathered information about usage. Other tracking areas not considered to be primary tracking areas are only paged if no positive page response is received. As a result, fewer tracking areas need to be paged and less tracking area update requests need to be sent, thereby yielding a reduced overall signaling load for paging and hence reduced interference.

Advantageously, the present solution may be implemented in an existing wireless communication system, such as an EPS network, without changes to the signaling procedures between the communication device, or user equipment, and the second network node, such as an MME, for tracking area update procedures and paging procedures.

Further features of, and advantages with, the present invention will become apparent when studying the following description. Those skilled in the art realize that different features of the present invention may be combined to create embodiments other than those described in the following.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
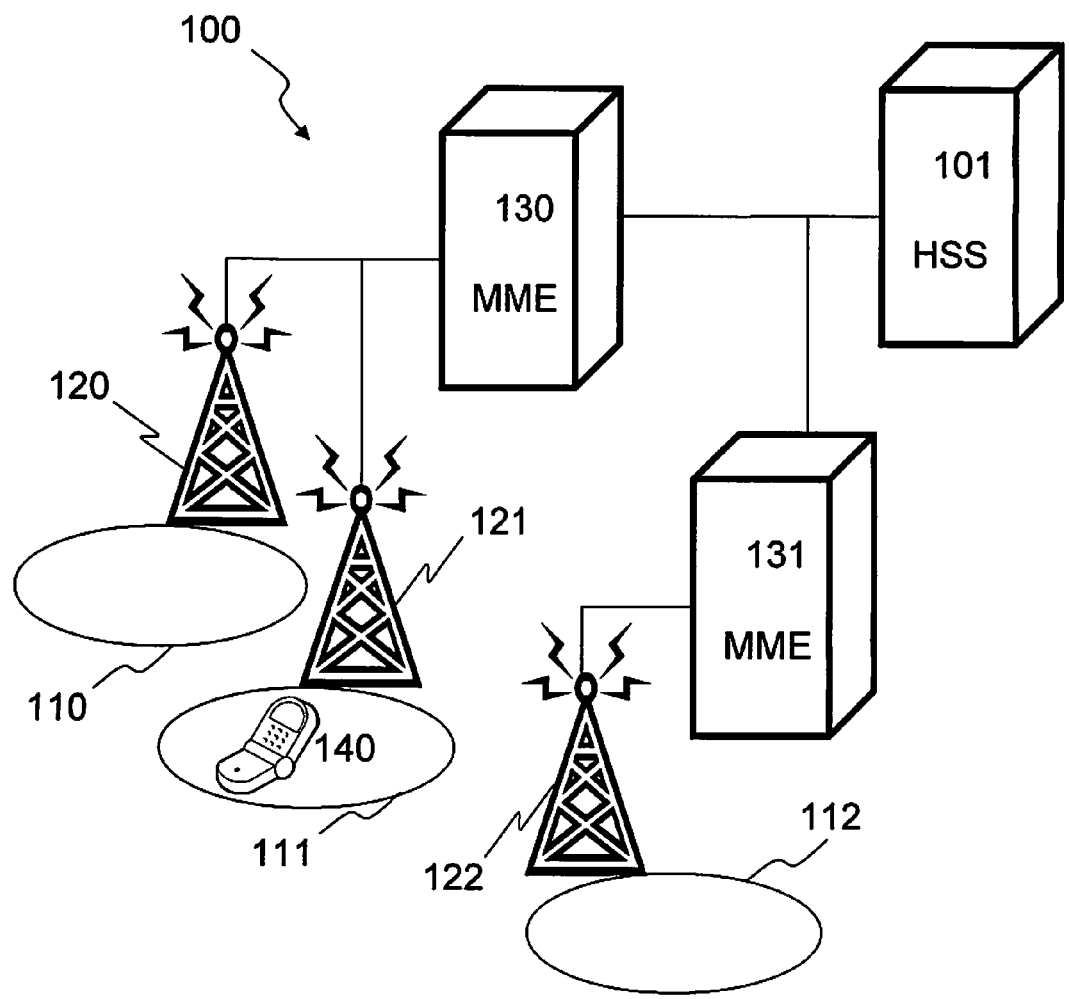
FIG. 1 shows a schematic, exemplifying system to which the present invention may be applied.

Throughout the following description similar reference numerals have been used to denote similar elements, parts, items or features, when applicable.

It may be noted that the expression "user equipment" includes, but is not limited to, a mobile terminal, a mobile phone, a personal digital assistant, a mobile station, a portable computer equipped with suitable transceivers, a stationary computer equipped with suitable transceivers and the like.

FIG. 1 shows a schematic overview of a wireless communication network 100. The wireless communication network 100 comprises an HSS 101 (a first network node), an MME 130 (a second network node), 131, a third radio network node 120, 121, 122 and a user equipment 140. The third radio network node 120, 121, 122, such as a radio base station network node, is served by the MME 130, 131. Each radio base station network node 120, 121, 122 is associated with at least one cell 110, 111, 112. Furthermore, a tracking area identifier (also referred to as tracking area identity) is associated with at least one cell 110, 111, 112. The first and second network nodes 101, 130 may be comprised in a core network node 101, 130. Hence, in the following, when referring to the core network node, the expression "core network node" is to be understood as meaning any one of the first and second network nodes 101, 130. Moreover, a data collection node may comprise any one of the second network node and the user equipment.

Figure 2:
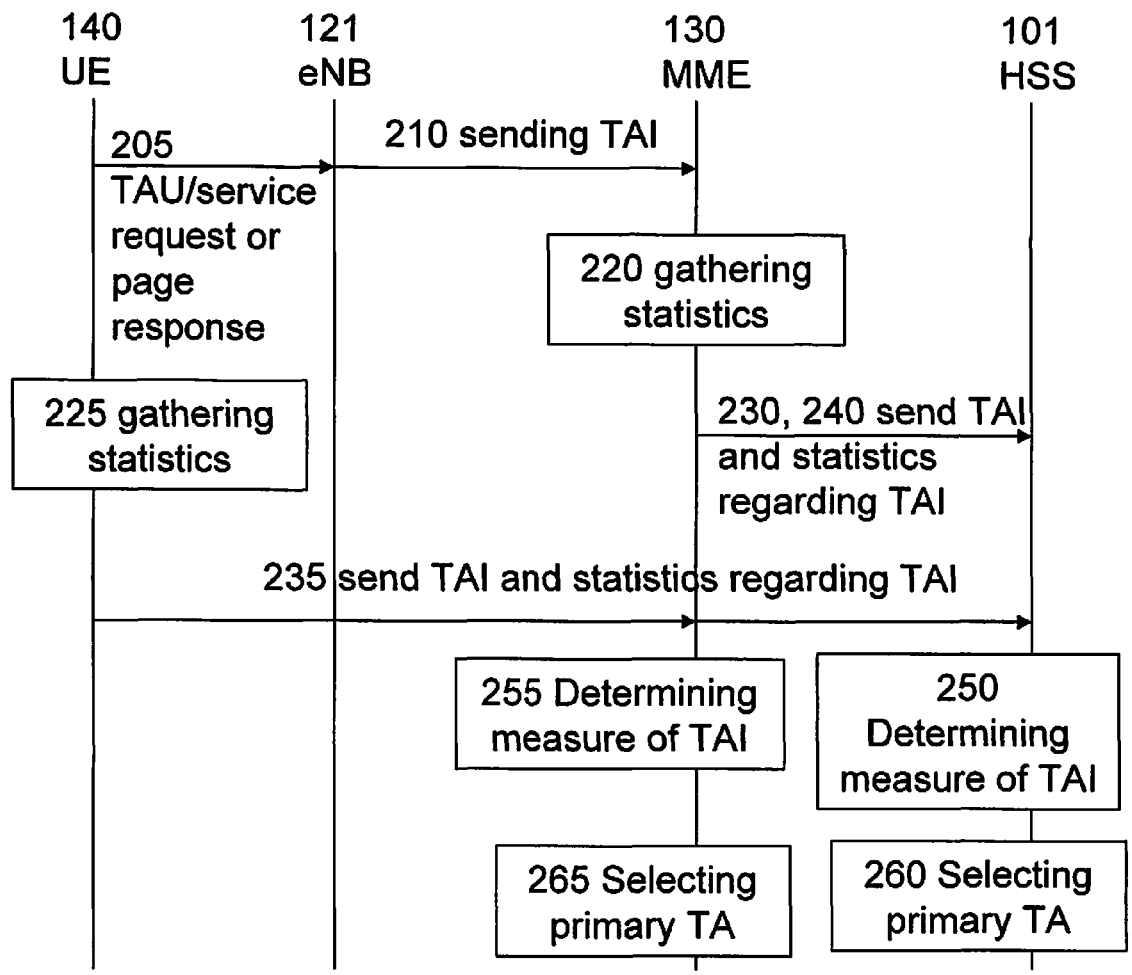
FIG. 2 shows a schematic combined signaling and flow chart of an embodiment of the method performed in the system according to FIG. 1.

With reference to FIG. 2, there is shown a schematic, combined signaling and flow chart for a method in the wireless communication network 100 for identifying at least one tracking area or tracking area identifier for use as a primary tracking area identifier.

205 In a step 205, the UE sends a TAU request, a service request or a page response.

210 In a step 210, the radio network node 120, 121, 122 sends a tracking area identifier associated with the current cell of the UE to the MME 130, when forwarding a message from the UE 140, in conjunction with for example a tracking area update, a service request or a page response or a combination thereof, wherein the message from the UE also may include a tracking area identifier.

220 In a step 220, the MME 130, 131 (the second network node) collects or gathers statistics about the tracking area identifiers sent from the UE and the radio network node. For example, information such as dwelling time in cells and TAs, page response and service request, TA entrances, TA border crossings, camped cells and visited TAs may be registered, one or more of the aforementioned pieces of information possibly divided into statistics per different time periods of the day and/or per different days of the week. See more description about each of the pieces of information below.

225 In an optional step 225, performed in addition to or as an alternative to step 220, the user equipment 140 collects or gathers statistics about the tracking area identifiers sent from the UE and the radio network node. For example, information such as dwelling time in cells and TAs, page response and service request, TA entrances, TA border crossings, camped cells and visited TAs may be registered, one or more of the aforementioned pieces of information possibly divided into statistics per different time periods of the day and/or per different days of the week. See more description about each of the pieces of information below. Step 230 is performed only if step 220 was performed, i.e. not if step 225 was performed instead of step 220.

230 In an optional step 230, the MME sends the TA identifiers or identities and the collected statistics or information for the tracking area to the HSS 101 or an O&M node, Operation and Management node (not shown), for further processing.

235 In an optional step 235, the user equipment sends the TA identifiers or identities and the collected statistics or information for the tracking area to the second network node 130 for further processing. In some cases, the second network node merely forwards the collected statistics or information for the tracking area to the HSS, which selects the primary TA (see steps 250 and 260). Step 235 is performed only if step 225 was performed.

240 In a step 240, the HSS 101 (or O&M node) receives the TA identifier and information about the TA from one or more MMEs 130, 131. Step 240 is performed only if step 220 was performed, i.e. not if step 225 was performed instead of step 220.

250 In a step 250, the HSS 101 determines a measure for each TA received based on the information received. For example, the measure may be a probability for the UE being located in the received tracking area, wherein the measure of probability preferably is based on probability of receiving a page response from the UE if paging the UE in the received tracking area and/or time spent by the UE in the received tracking area, and

260 In a step 260, the HSS 101 selects the TA as a primary TA if the determined measure exceeds a certain threshold. The threshold may be preconfigured or dynamically set based on the received information about TAs. Steps 255 and 265 are performed only if steps 220, 230 and 240 were performed, i.e. not if step 225 was performed instead of step 220.

255 In an optional step 255, the MME 130 determines a measure for each TA. For example, the measure may be a probability for the UE being located in the received tracking area, wherein the measure of probability preferably is based on probability of receiving a page response from the UE if paging the UE in the received tracking area and/or time spent by the UE in the received tracking area.

265 In an optional step 265, the MME 130 sets the received tracking area as a primary tracking area if the measure exceeds a threshold. Optionally, the threshold is determined based on a probability for paging the UE and receiving a page response when the UE is located in a number of tracking areas previously registered. The threshold may be set such that load on the network due to paging and/or tracking area update requests is reduced. In this manner, the threshold is set such as to reduce load on the network due to paging and/or tracking area update requests. Steps 255 and 265 are performed only if steps 225 and 235 were performed.

It is also possible that the UE 140 determines the primary TA, based on statistics collected in step 225 and after comparing a measure derived from the statistics with a threshold. In such a case, the UE 140 transfers the TAI of the selected primary TA to the MME 130 in step 235.

It may be noted that the measure is based on probability of receiving/sending a page response, time spent in TA, etc., in the sense that the measure is dynamically derived from the gathered statistics. The threshold on the other hand, is based on probability of receiving/sending a page response, time spent in TA, etc., in the sense that the threshold is expressed in terms of those parameters (i.e. the same units as the measure to be compared with the threshold), but the threshold value itself does not have to be dynamically derived from the gathered statistics. The threshold may also be preconfigured.

Figure 3:
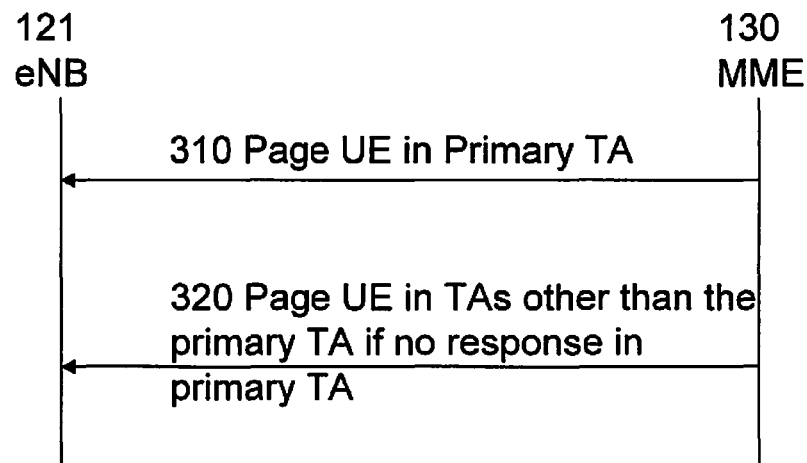
FIG. 3 shows a schematic signaling chart of messages sent between the second network node and the third radio network node.

Now with reference to FIG. 3, there is shown a schematic, combined signaling and flow chart for a method in the wireless communication network 100 for paging a user equipment (UE) while taking advantage of at least one primary tracking area identifier. Some of the following steps may be performed.

310 In a step 310, the MME 130 pages the UE 140 by sending a page message in cell(s) 111 (or, more precisely, by requesting the radio base station(s) serving the cell(s) 111 to send page message(s) to the UE 140) associated with the primary tracking area identifier.

315 In an optional step 315 (not shown), the MME waits a predetermined period of time for a page response from the UE. The predetermined period of time may be set when configuring the network or may be dynamically adjusted, for example depending on time of day or even depending on the threshold set for the primary tracking area identifier. For example, a shorter predetermined period of time may be used for a lower threshold and a longer predetermined period of time may be used for a higher threshold. The other way around is also possible, i.e. using a longer predetermined period of time for a lower threshold and a shorter predetermined period of time for a higher threshold.

320 In a step 320, if no page response is received from the UE 140 within the predetermined period of time, the MME pages the UE 140 in cell(s) (or, more precisely, by requesting the radio base station(s) serving the cell(s) to send page message(s) to the UE 140) not associated with the primary tracking area identifier (and, optionally, also in the cell(s) associated with the primary tracking area identifier).

Figure 4:
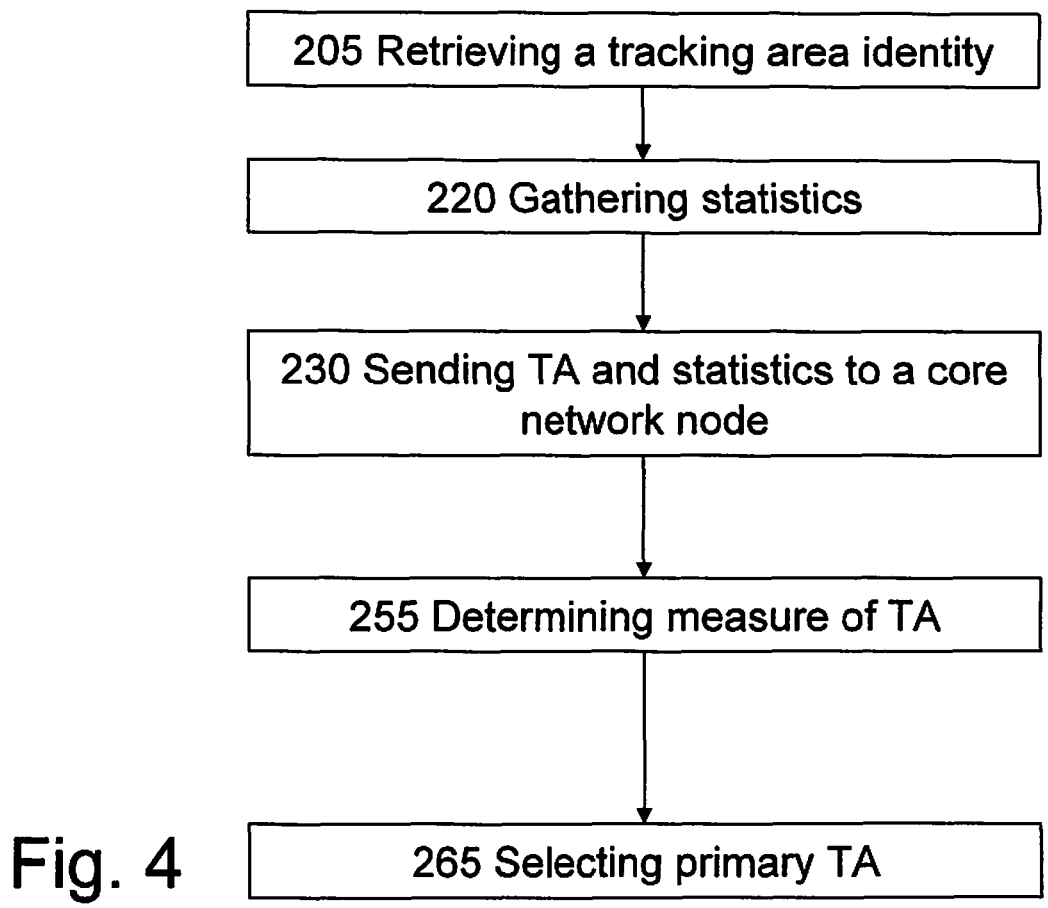
FIG. 4 shows a schematic flow chart of an embodiment of the method in the data collection network node.

In FIG. 4, there is illustrated a schematic flow chart of the method in the data collection network node 130, 140, such as an MME (or a second network node) or a user equipment, for gathering information to be used for identification of at least one primary tracking area associated with a user equipment, wherein a wireless communication network, such as an EPS network, comprises the data collection network node. The following steps may be performed.

205 In a step 205, the data collection network node 130, 140 retrieves a tracking area identity, preferably from (or in conjunction with) a service or tracking area update request or a page response, each one of the service or tracking area update request or the page response being sendable or receivable by the data collection network node.

220 In a step 220, the data collection network node 130, 140 registers (or gathers) information about usage of a tracking area identified by the retrieved tracking area identity, wherein the information is to be used for identification of at least one primary tracking area.

Advantageously, the data collection network node is a second network node, such as an MME. In this manner, the UE behavior is not affected. Hence, backward compatibility problems related to UEs are avoided.

In some embodiments of the method in the data collection network node 130, 140, the information about usage comprises information about one or more of the following items cell dwelling time, tracking area dwelling time, number of page responses, service requests, tracking area entrances, tracking area border crossings, identities of camped cells (applies to the case when the data collection network node is a user equipment) and identities of tracking areas visited by the user equipment and, optionally, one or more of the preceding items is divided, or sorted, into one or more periods of time, such as a period of a day, a day, a week, a month or a year. Furthermore, it is contemplated that the information about usage comprises information about Closed Subscriber Group (CSG) cells (also referred to as femto cells) associated with the mobile terminal.

In some embodiments of the method in the data collection network node, the third radio network node is a radio base station serving the current cell of the user equipment.

In some embodiments of the method in the data collection network node, the data collection network node is a second network node 130, such as a Mobility Management Entity, MME, and the retrieved tracking area identity is received by the second network node 130 from a third radio network node 121. The wireless communication network 100 comprises a third radio network node 121. Optionally, the user equipment does however supply in the Tracking Area Update Request message (and/or in the Attach Request message) a tracking area identifier for identifying the "last visited registered TA". The purpose of this information is to provide some input to a "tracking area identifier list allocation algorithm" in the MME.

In some embodiments of the method in the data collection network node, the data collection network node is a second network node, such as an MME and the method further comprises a step 230 of sending the registered information to a first network node, such as an HSS, wherein the first network node is configured to use the registered information for selecting, based on the registered information, at least one primary tracking area, wherein the first network node is comprised in the wireless communication network. For example, an HSS managing a first and a second MME may consequently receive information about usage of cells/tracking areas from the first and second MMEs, whereby a larger statistical basis for the selection of a primary tracking area is obtained. Moreover, the HSS may, as opposed to most MMEs, permanently store the received information for use in a later session. In some embodiments where the data collection node is a second network node, such as an MME, the second network node in step 230 sends the registered information to an operation and maintenance (O&M) node instead of an HSS.

In some embodiments of the method in the data collection network node, the data collection network node is a second network node, such as an MME. The wireless communication network further comprises a user equipment, optionally located in the tracking area identified by the retrieved tracking area identity. The method may comprise one or more of the following steps.

230 In a step 230, the second network node 130 sends the TA identifiers or identities and the collected statistics or information for the tracking area to the HSS 101 or an O&M node, Operation and Management node (not shown), for further processing. It may be noted that the HSS (or O&M) node is the node which in this manner gets a network-wide overview (by receiving info from several MMEs) and which can process the overall collected statistics and calculate primary tracking areas. This is in general not performed by the MME, which does not obtain a complete overview of the UEs whereabouts and only has a portion of the statistical information available to the HSS or O&M. The MME may refine the collected info to some degree (e.g. dividing the number of page responses by the time spend in a TA) before sending it to the HSS (or O&M node), but in most cases the second network node, i.e. the MME, merely forwards the information to the HSS (or O&M node).

255 In a step 255, the second network node 130 determines a measure for the user equipment, wherein the measure preferably is based on probability of paging and receiving a page response from the user equipment when the user equipment is located in the tracking area and/or time spent by the user equipment in the tracking area. Expressed differently, the measure may preferably be based on one or more of probability for receiving a page response from the user equipment if the user equipment is located in the tracking area, time spent by the user equipment in the tracking area, and tracking area border crossings.

In some embodiments of the method in the data collection network node 130, wherein the data collection network node is a second network node, the second network node is temporarily configured to assign only one tracking area to a user equipment in response to a tracking area update request from the user equipment. In this manner, the second network node is allowed to more closely follow the movements of the user equipment, since as soon as the user equipment leaves the presently assigned tracking area, the user equipment will need to send a tracking area update request. The second network node will then be able to register the tracking area, whose identity is conveyed together with the tracking area update request.

In some embodiments of the method in the data collection network node 130, 140, the data collection network node 130, 140 is a user equipment 140, the tracking area identity is capable of being sent to a core network node 101, 130, e.g. by a third radio network node, which is a radio base station serving the current cell of the user equipment, and the registered information, or tracking area identity of a primary tracking area selected by the user equipment, is sent to the core network node 101, 130 by the user equipment. The wireless communication network 100 comprises the core network node 101, 130.

In some embodiments of the method in the data collection network node, the data collection network node is a user equipment 140, the tracking area identity is sendable (capable of being sent) to a core network node 101, 130, e.g. by a third radio network node, which is a radio base station serving the current cell of the user equipment, and the registered information is periodically sent to the first network node (if applicable).

In some embodiments of the method in the data collection network node, the data collection network node comprises a user equipment 140. The following step may be performed.

265 In a step 265, the second network node 130 selects (determines or identifies) said at least one tracking area identifier of at least one tracking area to be used as a primary tracking area, if the measure exceeds a threshold. In other words, the selected tracking area identifier is used for identifying a primary tracking area. Optionally, the threshold is determined based on a probability for paging the user equipment and receiving a page response when the user equipment is located in a number of tracking areas previously registered. Hence, the threshold determined based on a probability that the user equipment is located in the tracking area that is paged. Using a different expression, the threshold is based on probability for receiving a page response if the user equipment is located in the tracking area of the selected tracking area identity. In this manner, the threshold is set such as to reduce load on the network due to paging and/or tracking area update requests.

In some embodiments of the method in the data collection network node 130, 140, the wireless communication network 100 further comprises a core network node 101, 130, and the data collection network node comprises a user equipment 140. The method may further comprise the following steps.

In a step, the user equipment selects the tracking area identity to be used for identifying a primary tracking area based on the registered information.

In another step, the user equipment sends the tracking area identity to the core network node 101, 130.

In some embodiments of the method in the data collection network node 130, 140, the step of selecting the tracking area identity for identifying the primary tracking area further comprises the following steps.

In a step, the data collection network node determines a measure for the user equipment 140, wherein the measure is based on one or more of probability for receiving a page response from the user equipment if the user equipment is located in the tracking area, time spent by the user equipment in the tracking area, tracking area entries and tracking area border crossings.

In another step, the data collection network node selects the tracking area to be used for identifying the primary tracking area if the measure exceeds a threshold. Optionally, the threshold is based on probability for receiving a page response if the user equipment is located in the tracking area of the elected tracking area identity.

Figure 5:
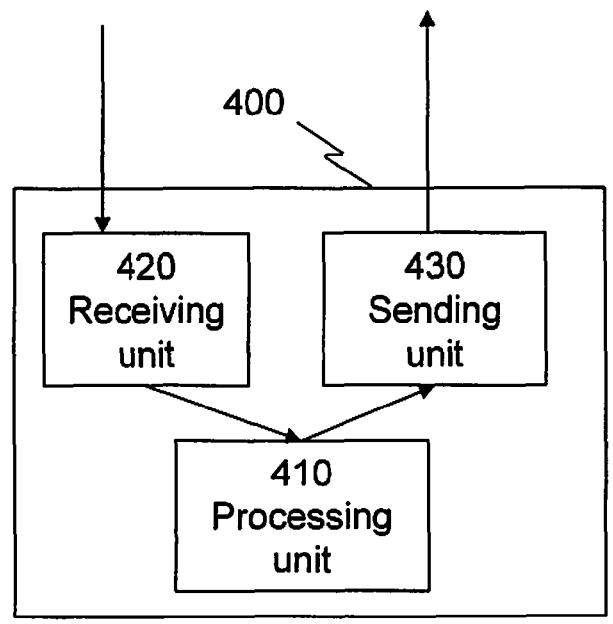
FIG. 5 shows a schematic block diagram of an embodiment of the arrangement in the data collection network node.

FIG. 5 shows a schematic block diagram of an embodiment of the arrangement 400 in the data collection network node for gathering information to be used for identification of at least one primary tracking area identifier associated with a user equipment. A wireless communication network 100, such as an EPS network, comprises the data collection network node 130. The arrangement 400 comprises a retrieving unit configured to retrieve a tracking area identity, preferably from (or in conjunction with) a service or tracking area update request or a page response, each one of the service or tracking area update request or the page response being sendable or received by the data collection network node. Furthermore, the arrangement 400 comprises a processing unit 410 configured to register information about usage of a tracking area identified by the retrieved tracking area identity. Optionally, the arrangement 400 may comprise a sending unit 430 and a receiving unit 420.

In some embodiments of the arrangement 400 in the data collection network node, the information about usage comprises information about one or more of the following items cell dwelling time, tracking area dwelling time, number of page responses, service requests, tracking area entrances, tracking area border crossings, identities of camped cells and identities of tracking areas visited by the user equipment and, optionally, one or more of the preceding items is sorted into one or more periods of time, such as a period of a day, a day, a week, a month or a year.

In some embodiments of the arrangement 400 in the data collection network node, the data collection network node is a Mobility Management Entity, MME (or a second network node), and the tracking area identity is retrieved by the retrieving unit from a third radio network node 121. The wireless communication network 100 comprises the third radio network node 121.

In some embodiments of the arrangement 400 in the data collection network node, the data collection network node is an MME. The arrangement 400 further comprises a sending unit 430 configured to send the registered information to a first network node, such as an HSS. The first network node is configured to use the registered information for selecting a primary tracking area, wherein the first network node is comprised in the wireless communication network.

In some embodiments of the arrangement 400 in the data collection network node, the data collection network node is an MME. The wireless communication network further comprises a user equipment located in the tracking area identified by the retrieved tracking area identity. The arrangement 400 further comprises a processing unit 410 configured to determine a measure for the user equipment, wherein the measure preferably is based on probability of paging and receiving a page response from the user equipment when the user equipment is located in the tracking area and/or time spent by the user equipment in the tracking area. Optionally, the measure may be based on one or more of probability for receiving a page response from the user equipment if the user equipment is located in the tracking area, time spent by the user equipment in the tracking area, and tracking area border crossings. Moreover, processing unit 410 is configured to select (or determine) said at least one tracking area identifier whose associated tracking area is to be used as a primary tracking area, if the measure exceeds a threshold, optionally the threshold is determined based on a probability for paging the user equipment and receiving a page response when (or if) the user equipment is located in a number of tracking areas previously registered. In this manner, the threshold is set such as to reduce load on the network due to paging and/or tracking area update requests.

In some embodiments of the arrangement 400 in the data collection network node 130, 140, the data collection network node 130, 140 is a user equipment 140, the tracking area identity is capable of being sent to a core network node 101, 130, e.g. by a third radio network node, which is a radio base station serving the current cell of the user equipment, and the registered information, or the tracking area identity of a primary tracking area selected by the user equipment, is sent to the core network node 101, 130 by the user equipment. The wireless communication network 100 comprises the core network node 101, 130.

In some embodiments of the arrangement 400 in the data collection network node, the data collection network node is a user equipment 140, the tracking area identity is sendable to a core network node 101, 130, e.g. by a third radio network node, which is a radio base station serving the current cell of the user equipment, and the registered information is periodically sent to the first network node by the user equipment (if applicable).

In some embodiments of the arrangement 400 in the data collection network node 130, 140, the data collection network node is a user equipment and the wireless communication network 100 further comprises a core network node 101, 130. The processing unit 410 may further be configured to select the tracking area identity to be used for identifying a primary tracking area based on the registered information. The sending unit 430 may further be configured to send the tracking area identity to the core network node 101, 130.

In some embodiments of the arrangement 400 in the data collection network node 130, 140, the processing unit 410 may further be configured to determine a measure for the user equipment 140, wherein the measure is based on one or more of probability for receiving a page response from the user equipment if the user equipment is located in the tracking area, time spent by the user equipment in the tracking area, tracking area entries and tracking area border crossings. Moreover, the processing unit 410 may further be configured to select the tracking area identity to be used for identifying the primary tracking area if the measure exceeds a threshold. Optionally, the threshold is based on probability for receiving a page response if the user equipment is located in the tracking area of the elected tracking area identity.

In some embodiments of the arrangement 400 in the data collection network node, where the data collection network node is a second network node (which may be an MME 130), the second network node is temporarily configured to assign only one tracking area to a user equipment in response to a tracking area update request from the user equipment. In this manner, the second network node is allowed to more closely follow the movements of the user equipment, since as soon as the user equipment leaves the presently assigned tracking area, the user equipment will need to send a tracking area update request. The second network node will then be able to register the tracking area, whose identity is conveyed to the second network node together with the tracking area update request.

Figure 6:
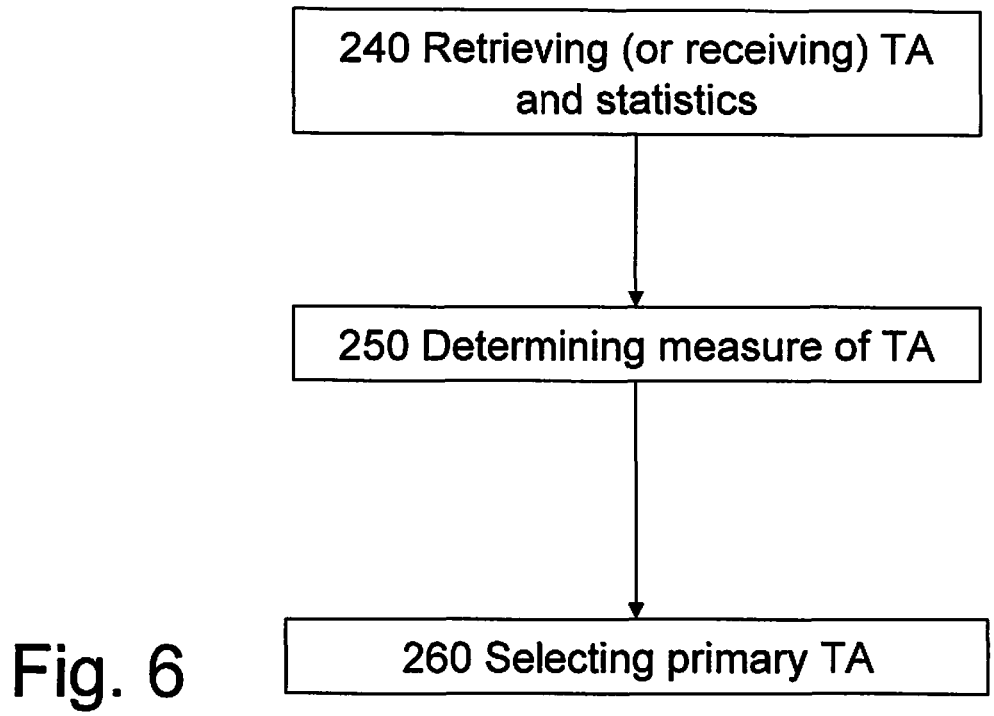
FIG. 6 shows a schematic flow chart of an embodiment of the method in the core network node.

FIG. 6 shows a schematic flow chart of an embodiment of the method in a core network node 101, such as a first network node (an HSS) 101 or a second network node (MME) 130, for selecting at least one tracking area identity whose associated tracking area is to be used as at least one primary tracking area for a UE, wherein a wireless communication network comprises the core network node and the UE. The following steps may be performed.

240 In a step 240, the core network node 101, 130 retrieves information about at least one tracking area for the user equipment, wherein the information preferably comprises one or several of cell and/or tracking area dwelling times, page response and service request statistics, (e.g. the frequency of page responses from the user equipment while located in said at least one tracking area), tracking area entrances, tracking area border crossings, camped cells or tracking areas visited by the user equipment or a combination thereof, optionally one or more of the aforementioned items possibly divided into statistics per different time periods of the day and/or per different days of the week.

250 In a step 250, the core network node 101 determines a measure for the user equipment being located in the tracking area, wherein the measure optionally is based on probability of paging and receiving a page response from the user equipment when (or if) the user equipment is located in the tracking area and/or time spent by the user equipment in the tracking area. More generally, the measure is based on one or more of probability for receiving a page response from the user equipment if the user equipment is located in the tracking area, time spent by the user equipment in the tracking area, and tracking area border crossings.

260 In a step 260, the core network node 101 selects (or identifies) said at least one tracking area identifier whose associated tracking area is to be used as a primary tracking area, if the measure exceeds a first threshold, optionally the threshold is determined based on a probability for paging the user equipment and receiving a page response when the user equipment is located in a number of tracking areas previously registered. In this manner, the threshold is set such as to reduce load on the network due to paging and/or tracking area update requests.

In some embodiments of the method in a core network node, the threshold is based only on information relating to tracking areas belonging to the same MME pool as the user equipment (is currently located in). The same MME pool may comprise one or more second network nodes 130.

In some embodiments of the method in the core network node, the method further comprises a step of selecting said at least one tracking area identifier identifying a tracking area to be used as a secondary tracking area, if the measure exceeds a second threshold, optionally the threshold is determined based on a probability for paging the UE and receiving a page response when (or if) the user equipment is located in a number of tracking areas previously registered. The second threshold may also be based on the retrieved information. Optionally, the second threshold is preconfigured or dynamically determined based on the information collected for the user equipment and/or the measure determined for the user equipment or probability for receiving a page response if the user equipment (140) is located in the tracking area of the selected tracking area identity Further, in some embodiments of the method in the core network node, said at least one tracking area identifier of at least one primary tracking area and said at least one tracking area identifier of at least one secondary tracking area are selected based on reduction of number of tracking area updates and on reduction of number of tracking areas or number of cells involved in paging, respectively or vice versa. Furthermore, said at least one tracking area identifier of at least one primary tracking area and said at least one tracking area identifier of at least one secondary tracking area may be selected based both on reduction of number of tracking area updates and on reduction of number of tracking areas or number of cells involved in paging and a trade-off between these two objectives.

Moreover, in some embodiments of the method in the core network node, said at least one tracking area identifier of at least one primary tracking area and said at least one tracking area identifier of at least one secondary tracking area are selected by comparing measures of usage with different thresholds, such as different probability levels for page response or different dwelling times or the like as further described herein.

In some embodiments of the method in the core network node, the retrieved information is comprised in subscriber information, wherein the subscriber information comprises information about what tracking area identifiers are associated with the user equipment according to a subscription agreement. Each tracking area identifier is associated with a tracking area. Hence, it may be said that the tracking area(s) in terms of its/their tracking area identity/identities is/are associated with the user equipment according to a subscription agreement. Moreover, it may be stated that the tracking area identifiers are associated with a certain subscriber, which in turn may be associated with one or more pieces of user equipment. This may occur, when the certain subscriber wishes to use different pieces of user equipment, for example different mobile phones, for different occasions or when the subscriber wishes to replace his/her mobile phone with a newer model with more functions and/or different appearance. Hence, throughout this application, where applicable, the expression "user equipment" is to be understood as meaning a subscriber, a user equipment and/or a subscriber user equipment. The core network node may be the first network node, such as a HSS. For example, if the user equipment is operated under a corporate subscription, then it may be assumed that the user equipment often is within the office during working days. Hence, during certain periods of a day, there is a high probability that the user equipment will respond if paged in a cell which corresponds to the location of the office. It is then advantageous to let the tracking area identifier associated with the cell, corresponding to the location of the office, identify a primary tracking area.

Figure 7:
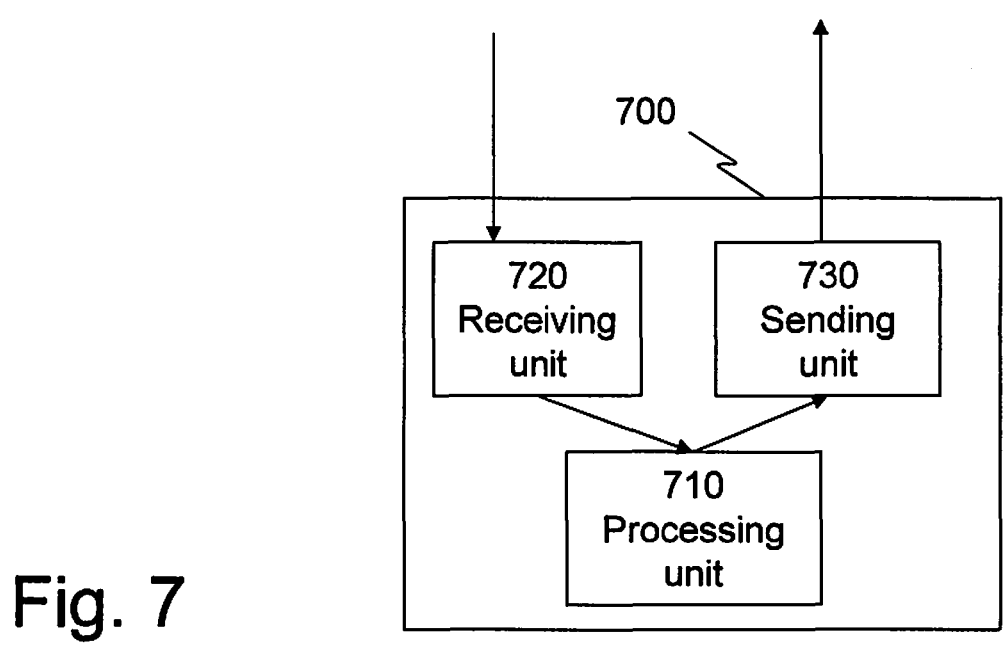
FIG. 7 shows a schematic block diagram of an embodiment of the arrangement in the core network node.

FIG. 7 shows a schematic block diagram of an embodiment of the arrangement 700 in the core network node 101, such as an HSS 101 or an MME 130, for selecting at least one tracking area identity identifying at least one tracking area to be used as at least one primary tracking area for a UE. A wireless communication network 100 comprises the core network node 101, 130 and the UE 140. The arrangement 700 comprises a retrieving unit 720 configured to retrieve information about a tracking area for the user equipment, wherein the information preferably comprises cell and/or tracking area dwelling times, page response and service request statistics, tracking area entrances, tracking area border crossings, camped cells or tracking areas visited by the user equipment or a combination thereof, optionally one or more of the aforementioned items possibly divided into statistics per different time periods of the day and/or per different days of the week. Furthermore, the arrangement 700 comprises a processing unit 710 configured to determine a measure for the user equipment being located in the tracking area, wherein the measure preferably is based on probability of paging and receiving a page response from the user equipment when the user equipment is located in the tracking area and/or time spent by the user equipment in the tracking area. The processing unit is configured to select (or identify) said at least one tracking area identifier identifying at least one tracking area to be used as a at least one primary tracking area, if the measure exceeds a first threshold, optionally the threshold is determined based on a probability for paging the user equipment and receiving a page response when the user equipment is located in a number of tracking areas previously registered. Using other words, the measure is based on one or more of probability for receiving a page response from the user equipment if the user equipment is located in the tracking area, time spent by the user equipment in the tracking area, and tracking area border crossings. Optionally, the first threshold is preconfigured or dynamically determined based on the information collected for the user equipment and/or the measure determined for the user equipment or probability for receiving a page response if the user equipment (140) is located in the tracking area of the selected tracking area identity. In this manner, the threshold is set such as to reduce load on the network due to paging and/or tracking area update requests.

In some embodiments of the arrangement 700 in the core network node, the threshold is based only on information relating to tracking areas belonging to the same MME pool as the user equipment. The core network node may be the second network node, such as an MME.

In some embodiments of the arrangement 700 in the core network node, the processing unit 710 is further configured to select said at least one tracking area identifier to identify at least one tracking area to be used as a secondary tracking area for the user equipment, if the measure exceeds a threshold, optionally the threshold is determined based on a probability for paging the UE and receiving a page response when the user equipment is located in a number of tracking areas previously registered.

In some embodiments of the arrangement 700 in the core network node, the processing unit 710 is configured to select said at least one tracking area identifier of at least one primary tracking area and said at least one tracking area identifier of at least one secondary tracking area based on reduction of number of tracking area updates and on reduction of number of tracking area identifiers or number of cells involved in paging, respectively or vice versa. Furthermore, said at least one tracking area identifier of at least one primary tracking area and said at least one tracking area identifier of at least one secondary tracking area may be selected based both on reduction of number of tracking area updates and on reduction of number of tracking areas or number of cells involved in paging and a trade-off between these two objectives.

Moreover, in some embodiments of the arrangement 700 in the core network node, the processing unit 710 is configured to select said at least one tracking area identifier of at least one primary tracking area and said at least one tracking area identifier of at least one secondary tracking area by comparing usage information with different thresholds, such as different probability levels for page response or different dwelling times or the like as further described herein.

In some embodiments of the arrangement 700 in the core network node, the information, retrieved by the retrieving unit 720, is comprised in subscriber information, wherein the subscriber information comprises information about what tracking area identifiers are associated with the user equipment according to a subscription agreement. For example, if the user equipment is operated under a corporate subscription, then it may be assumed that the user equipment often is within the office during working days. Hence, during certain periods of a day, there is a high probability that the user equipment will respond if paged in a cell which corresponds to the location of the office. It is then advantageous to let the tracking area identifier associated with the cell, corresponding to the location of the office, identify a primary tracking area.

Figure 8:
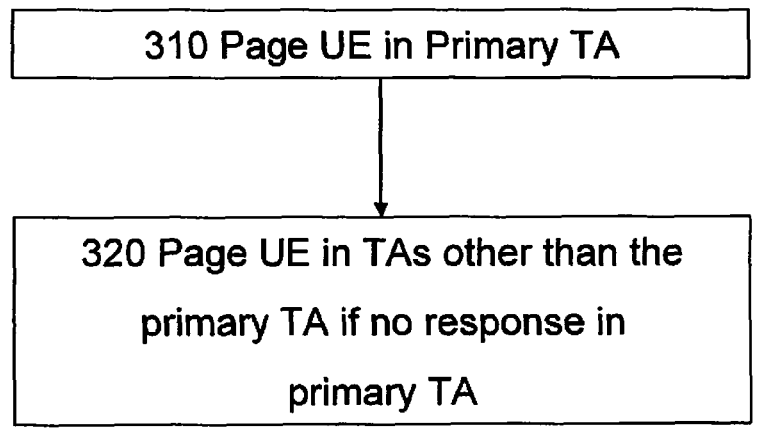
FIG. 8 shows a schematic flow chart of an embodiment of the method in the second network node.

FIG. 8 shows a schematic flow chart of an embodiment of the method in the second network node 130, such as an MME, for paging a user equipment. The second network node manages a list of tracking area identifiers associated with the user equipment, wherein the list comprises at least one tracking area identifier associated with a primary tracking area associated with the user equipment. That is to say, the list comprises at least one tracking area identifier for identifying at least one primary tracking area, wherein each one of the tracking areas identified by said tracking area identifiers and said at least one primary tracking area is associated with at least one cell served by a third radio network node. Each one of the tracking area identifiers and said at least one primary tracking area identifier identifying at least one primary tracking area is associated with at least one cell served by a third radio network node. The third radio network node is managed by the second network node. The wireless communication network 100 comprises the second network node 130, the third radio network node 121 and the user equipment 140. The following steps are performed.

310 In a step 310, the second network node 130 pages the user equipment 140 in at least one cell associated with said at least one primary tracking area.

320 If no response, trigged by the step of paging the user equipment in said at least one cell associated with said at least one primary tracking area, is received from the user equipment, then in a step 320, the second network node 130 pages the user equipment in cells associated with a set of tracking area identifiers. The set of tracking area identifiers are selected among the tracking area identifiers in the list of tracking area identifiers, wherein each tracking area identifier in the set of tracking area identifiers preferably are different from the at least one tracking area identifier of the at least one primary tracking area.

It is to be understood that step 310 and 320 may be preceded by steps 220, 255 and 265 for gathering data on which measure of tracking areas may be based and on which the selection of a primary tracking area may be based.

In some embodiments of the method in the second network node, the list of tracking area identifiers comprises at least one tracking area identifier associated with at least one secondary tracking area.

In some embodiments of the method in the second network node, the at least one primary tracking area is used during a first period of time and/or the at least one secondary tracking area is used during a second period of time, wherein the first and second periods of time are configured to be overlapping, non-overlapping or partly overlapping. In other words, there is at least one primary and at least one secondary tracking area, which are set up to be used during a first and second period of time, respectively. The first and second time period may be overlapping, non-overlapping or partly overlapping.

In some embodiments of the method in the second network node, method further comprises a step of paging the UE in at least one cell associated with said at least one secondary tracking area, if no response is received from the user equipment 140 as a result of the step of paging the user equipment in at least one cell associated with said at least one primary tracking area. In other words, the UE is paged in the at least one secondary tracking area if paging in the at least one primary tracking area has failed.

In some embodiments of the method in the second network node, method further comprises a step of paging the UE in at least one cell associated with the at least one tracking area identifier associated with at least one secondary tracking area, if no response is received from the UE as a result of the step of paging by using the at least one tracking area identifier associated with at least one primary tracking area. In other words, the UE is paged by using the at least one tracking area identifier identifying at least one secondary tracking area if paging by using the at least one tracking area identifier associated with at least one primary tracking area has failed.

Figure 9:
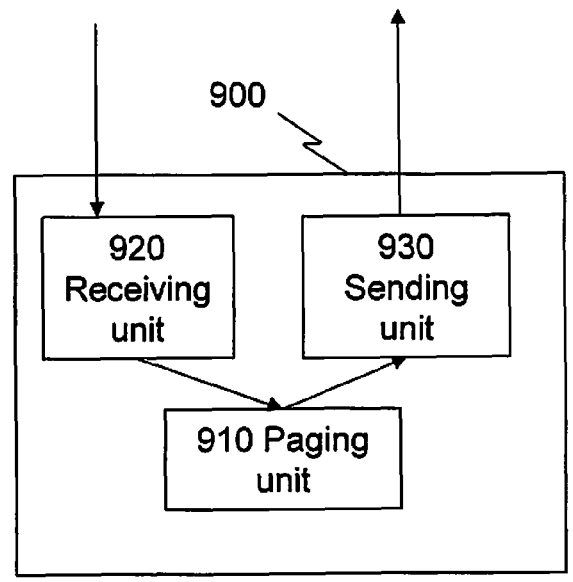
FIG. 9 shows a schematic block diagram of an embodiment of the arrangement in the second network node.

Now with reference to FIG. 9, an embodiment of the arrangement 900 in the second network node 130, such as an MME, for paging a user equipment is shown. The second network node manages a list of tracking area identifiers associated with the user equipment, wherein the list comprises at least one tracking area identifier for identifying at least one primary tracking area. Each one of the tracking areas identified by said tracking area identifiers and said at least one tracking area identifying at least one primary tracking area is associated with at least one cell served by a third radio network node. The third radio network node is managed by the second network node. The wireless communication network 100 comprises the second network node 130, the third radio network node 121 and the user equipment 140. The arrangement 900 comprises a paging unit 910 configured to page the user equipment 140 in at least one cell associated with said at least one primary tracking area. Moreover, the paging unit 910 may further be configured to, if no response, triggered by the paging of the user equipment in said at least one cell associated with said at least one primary tracking area, is received from the user equipment, page the user equipment in cells associated with a set of tracking area identifiers. The set of tracking area identifiers are selected among the tracking area identifiers in the list of tracking area identifiers, wherein each tracking area identifier in the set of tracking area identifiers preferably is different from the at least one tracking area identifier associated with at least one primary tracking area.

In some embodiments of the arrangement 900 in the second network node 130, the list of tracking area identifiers comprises at least one tracking area identifier for identifying at least one secondary tracking area.

In some embodiments of the arrangement 900 in the second network node 130, the at least one primary tracking area is used during a first period of time and/or the at least one secondary tracking area is used during a second period of time, wherein the first and second periods of time are configured to be overlapping, non-overlapping or partly overlapping. In other words, there is at least one primary and at least one secondary tracking area, which are set up to be used during a first and second period of time, respectively. The first and second time period may be overlapping, non-overlapping or partly overlapping.

In some embodiments of the arrangement 900 in the second network node 130, the paging unit further is configured to page the UE in at least one cell associated with the at least one secondary tracking area, if no response is received from the UE as a result of the step of paging the user equipment in the at least one primary tracking area. In other words, the UE is paged in the at least one secondary tracking area if paging the UE in the at least one primary tracking area has failed.

Most methods of prior art do not take the behavior, in terms of long-term average mobility patterns and dwelling habits (i.e. how long the subscriber/UE is located in each TA), of individual subscribers (or mobile terminals) into account. Instead all subscribers are treated equally, thereby failing to leverage the possibility of individual optimizations.

Although this invention is generally applicable, one obvious thing that calls for individual optimizations as described above is the concept of 'home base stations' also known as femto cells/base stations, in LTE/SAE such a base station is known as a HeNB (Home E-UTRAN NodeB). These femto cells/base stations can be used to provide coverage in a home, enterprise, campus or the like.

A primary tracking area (TA) concept is introduced with the purpose of reducing the overall signaling load (and interference) caused by Tracking Area Updates (TAU) and pages.

The primary TA(s) is defined either by configuration or by observing the tracking area dwelling times (i.e. how long the subscriber is located in specific TA(s)) or the paging.

UE originated service requests and the location where they are performed may also be used as input data as well as handovers.

The primary tracking area identification/determination/selection can be done in the network only or assisted by the UE.

In some embodiments the UE is always first paged in the primary TA(s), if defined, assuming that the user with high probability is within that area.

When beneficial, the primary TA(s) is (are) transferred to the UE (i.e. included in the TA list) to decrease the amount of TAU.

In another embodiment two different types of primary TAs are introduced. One of them is used for reduction of the TAU load (by reducing the number of TAUs) and the other is used for reduction of the page load (by reducing the paging area for many pages).

There are two main embodiments of the invention, embodiments 1 and 2, both of which are subdivided into two "sub-embodiments" (sub-embodiments 1a, 1b and 2a, 2b).

Some advantages of the invention:
Reduced overall signaling load for TAU and paging.
Inherent refinement (and thus improvement) of the primary TA(s) over time.
Unchanged signaling for tracking area updates and paging.

An embodiment 1, wherein a Single Primary TA Type is used, is described below. The embodiment 1 comprises two sub-embodiments 1a and 1b.

Generally, for embodiment 1 the following applies. The primary TA can be configured or dynamically defined by the network. The configured alternative can be used e.g. for a corporate subscription then assuming the subscriber often is within the office during working days. Another usage could be for a femto (Home eNodeB) subscription, i.e. in a scenario where Closed Subscriber Groups (CSGs) are employed. Since the TA for a HeNB most likely will be automatically allocated to a HeNB, without geographical meaning, and a HeNB most likely will be associated with specific UE(s), these TAs are very suitable to become a primary TA. E.g., at the same time a UE is associated to a HeNB, the UE context in the HSS could be updated with the primary TA. There could be schemes based on day of week as well as time of day. The primary TA could be one or more TAs.

Several ways to identify/determine/select primary TA(s) are proposed. Registration of current TA when the UE is paged, e.g. in terms of the TAI of the cell in which the UE responds to the page, is one method and registration of the current TA at different service requests is another. Yet a method that can be used to track the location of the UE is the S1AP (S1 Application Protocol between an MME and an eNodeB, S1-interface between E-UTRAN and the core network in EPS, such as an MME or S-GW) Location Reporting procedure which provides a means for the MME to retrieve information from an eNodeB about the serving cell of a UE or changes to it. When a threshold is reached one (or more) TA(s) are considered as primary. The threshold could be measured as a certain long-term probability that the subscriber will answer a page in a certain TA. If the page answer probability exceeds the threshold in multiple TAs, then either the TA with the highest probability is selected as the primary TA or all the TAs fulfilling the threshold condition are defined as primary TAs (i.e. multiple primary TAs). The algorithm may also be designed to analyze the page answer probability for groups of TAs and select a suitable group of TAs as (multiple) primary TAs. The algorithm also needs to remove (unselect) a primary TA in case too many pages are successful in non-primary TA(s), e.g. if the page answer probability of the primary TA falls below the threshold (possibly with hysteresis).

Another way is to track the (absolute and/or) relative time spent in a TA. In this case the threshold condition could be measured as the time spent in a certain TA (or group of TAs) in relation to the total recorded dwelling time. The network (MME) can track the TA dwelling while the UE is connected (e.g. in EMM-CONNECTED state, i.e. not in idle mode). In case of a UE assisted scheme (see sub-embodiment 1b), the UE can track the TA dwelling time continuously, irrespective of state (i.e. connected, idle, etc.) in the UE. When beneficial, e.g. depending on the UE's current location in relation to the primary TA(s), the primary TA(s) is (are) included in the TA list sent to the UE when the TA list is updated or when the UE attaches to the network. The MME may not always include the primary TA(s) in the TA list. This may depend on the UE location (e.g. TA or cell) when the TA list is allocated, e.g. such that a primary TA is included in the TA list only if the UE is currently located reasonably close to (or inside) the primary TA or when there are other good reasons, e.g. if the primary TA is rather distant but it is reasonable to allocate a list of contiguous TAs from the UE's current location up to (and including) the primary TA (e.g. because there is a highway following that path). Furthermore, an obvious condition for inclusion of a primary TA in the TA list is that the primary TA belongs to the MME pool of the MME allocating the TA list (which also means that if multiple primary TAs are selected then only those of the multiple primary TAs that belong to the MME pool of the serving MME are eligible for inclusion in the TA list).

When the subscriber is paged, the serving MME, in some embodiments, pages the subscriber first in the primary TA(s) pending other possible conditions such as time of day etc. (if there is at least one primary TA associated with the subscriber) and then, if there is no response within reasonable time, in the remainder of the TAs in the TA list (optionally, including the primary TA(s) also in this second page).

In the following sub-embodiment 1a is described. Sub-embodiment 1a uses a network based primary TA identification/determination/selection procedure, i.e. the network gathers information about usage of tracking areas for a user equipment and then the network determines which one of the TAs or which of the TAs (if any) shall be used as a primary TA. The tracking of TA at successful paging (or at UE originated service requests) or time in a TA is done in the network e.g. by MME and HSS. When a subscriber is registered in an MME, the MME collects the previously described statistics (i.e. either page answers or TA dwelling time) for the subscriber. The statistics is transferred to the HSS, e.g. as an extension to the CANCEL LOCATION ACK message. When the subscriber is de-registered in the MME the MME may delete all the collected statistics associated with the subscriber. The HSS merges the statistics it receives from different MMEs, so that overall statistics can be maintained for each subscriber. The HSS would use an algorithm, which, based on the merged statistics, selects one or multiple TA(s) as primary TA(s), provided that at least one TA fulfils the condition for selection. When there is a primary TA (or primary TAs) associated with a subscriber, the HSS will transfer the TAI(s) of the primary TA(s) to the MME serving the subscriber, e.g. as a part of the subscriber data that is included in the INSERT SUBSCRIBER DATA REQUEST message. If the HSS is aware of the allocation of TAs to different MME pools, it may choose to transfer the TAI of the primary TA, or the TAIs of the primary TAs, to the serving MME only if the primary TA, or primary TAs, belong(s) to the MME pool of the serving MME. This may turn out to be a subset of multiple primary TAs associated with a subscriber. If the MME receives a TAI of a primary TA from the HSS, which TA does not belong to the MME pool of the MME, the MME will not use the primary TA.

In some embodiments of the method according to embodiment 1, an O&M node handles the task of collecting and merging the statistics contributions from the MMEs. In such case an O&M interface will be utilized (and not the CANCEL LOCATION ACK message) and the statistics may be collected e.g. by polling/retrieving counter values in the MMEs, in accordance with regular O&M principles. The O&M entity would also be responsible for applying a primary TA selection algorithm to the merged statistics and convey the TAI(s) of any selected primary TA(s) to the MMEs. Alternatively, the O&M entity transfers TAI(s) of selected TA(s) to the HSS for inclusion in the subscriber data stored in the HSS for forwarding to the MME serving the subscriber.

Moreover, in the following a sub-embodiment 1b is described. In sub-embodiment 1b the user equipment contributes to the procedure of gathering information about usage of the tracking areas for the user equipment itself. This embodiment is hereinafter referred to as sub-embodiment 1b with UE assisted primary tracking area identification.

The tracking (gathering of information about usage) of tracking area (or tracking area identities) at successful paging or time in TA is done in the UE and is reported to the network on demand or as an extension to already defined signaling (e.g. the NAS messages TAU REQUEST or ATTACH REQUEST). Since the UE is always aware of its own whereabouts and actions, it can maintain overall statistics on either successful page answers or TA dwelling time. The statistics would be stored in the Universal Subscriber Identity Module (USIM) in the UE, where it can be accumulated over time.

When the UE registers in a new MME, e.g. at network attachment or TAU, it transfers primary TA related information to the MME, e.g. as extensions to the ATTACH REQUEST message and the TAU REQUEST message. Alternatively (or additionally) the information may be transferred on request from the MME. The nature of the transferred information depends on where the primary TA selection algorithm is placed, for which there are two options in this sub-embodiment: in the UE or in the MME.

If the primary TA selection algorithm is placed in the UE, then it suffices to transfer the TAI(s) of any selected TA(s) to the MME, so that the MME can include it (them) in a TA list to be allocated to the UE. If the primary TA selection algorithm is located in the MME, then the UE must transfer enough statistical data to satisfy the algorithm's input data requirements. It may for instance suffice to transfer the data (e.g. page answer probability or relative dwelling time) for the TA(s) which has (have) the "best" statistics. The advantage of running the primary TA selection algorithm in the UE is that less data needs to be transferred to the network. The advantage of running the primary TA selection algorithm in the MME is that the network (and thus the operator of the network) is in control and can choose the algorithm and threshold condition(s) it prefers. In any case, if the UE is aware of which MME pool it is communicating with (which is indicated by the MMEGI (MME Group Identity) in the Globally Unique Temporary Identity (GUTI) allocated to the UE by the serving MME), then the UE will only transfer primary TA related information (statistics or TAI(s) of primary TA(s)) that concern TAs that belong to the current MME pool.

When a subscriber de-registers from an MME, any primary TA related data associated with the subscriber may preferably be deleted in the MME. With this UE assisted approach no primary TA related data has to be stored permanently in the network—only in the USIM.

Now, further embodiments of the method for gathering information about usage of tracking areas for a user equipment are disclosed.

In an embodiment of the method the selection of primary tracking area, comprising one or more tracking areas or tracking area identities, is based on time, such as time of day or day of a week.

For instance, the statistics (information about usage of a tracking area for a user equipment) could include data on time of day and day of the week (and even month of the year), so that the primary TA selection algorithm can select different primary TA(s) depending on time of day or day of the week (and even month of the year). It may also choose to apply a primary TA a certain time or day, while not applying any primary TA at all during other times. As a result, the statistics obtained is more fine-grained and the usage of the primary TA(s) can be correspondingly more fine-tuned.

If such a time dependent algorithm is used in the network-only alternative (embodiment 1a) and thus located in the HSS or an O&M entity, then there are different options for which entity that keeps track of the times when the primary TA(s) is (are) to be changed (or unselected). The HSS or the O&M entity may be responsible for this. In case of the HSS, the HSS would update the serving MME whenever the primary TA(s) change in any way, e.g. using the regular means to update a serving MME with changed subscriber data. In case of the O&M entity, the O&M entity would be responsible for the MME update via an O&M interface.

An alternative option is to let the MME be responsible for keeping track of the times when the primary TA(s) is (are) to be changed. In this case the HSS or O&M entity transfers not only the TAI(s) of the primary TA(s) to the MME, but also the conditions for when it (they) apply. For instance, if the selection algorithm selects one primary TA for office hours and another primary TA for non-office hours, then the TAIs of both these primary TAs, combined with the respective time periods when they are valid, are transferred to the MME. Then it is up to the MME to switch primary TA according to the received conditions. In any case the MME would not transfer the TAI(s) of the new TA(s) to the UE indiscriminately as soon as it becomes valid. It will wait until the next opportunity to transfer a new TA list to the UE, e.g. during the next TAU, in order not to introduce additional radio interface signaling.

The above described alternatives for responsibility division between different entities and consequent transfer of primary TA related information applies also to the UE assisted approach (embodiment 1b). In this case the UE has the role of the HSS or O&M entity in the procedure described above (i.e. in sub-embodiment 1a and its extensions), either in terms of both gathering and maintaining the overall (network-wide) statistics for a subscriber/UE as well as selecting the primary tracking area(s) for the subscriber/UE or in terms of only gathering and maintaining the overall (network-wide) statistics for a subscriber/UE. A difference from the role of the HSS or O&M entity in sub-embodiment 1a (and its extensions) is however that, in order not to introduce any additional signaling over the radio interface, the UE does not transfer any primary TA change related information to the MME, unless the regular signaling provides an opportunity.

In some embodiments of the method (e.g. variants or extensions of sub-embodiment 1a or 1b), the primary TAs may be selected per MME pool. For instance, a primary TA selection algorithm that is designed to select only a single primary TA (or a single group of TAs) can be executed separately for each MME pool, such that the "best" TA (or group of TAs) in each MME pool is selected as the primary TA(s) for a certain subscriber in that MME pool. However, each selected primary TA (or group of primary TAs) must still fulfill the selection condition (although the calculations are restricted to each MME pool such that when for instance measuring the relative TA dwelling time, the dwelling time of an individual TA is compared only with the total dwelling time in TAs belonging to the same MME pool).

In some embodiments of the method (e.g. variants or extensions of sub-embodiment 1a or 1b) a single cell is allowed to form a primary TA, even though there is no regular TA consisting of only that cell. The primary TA selection algorithm and the statistics gathering can be performed as previously described, with the addition that statistics per cell may also be gathered and considered by the primary TA selection algorithm. In order to enable paging in a single cell, the S1AP procedures for paging would have to be modified so that the MME can indicate a single cell to page the UE in and not only a TA.

Furthermore, if this method is to be used when the MME collects the input statistics (i.e. sub-embodiment 1a), the UE would have to handle the single cell as a normal TA when it comes to EMM (EPS Mobility Management) procedures like Tracking Area Updates. And if the UE does not include the cell identity in the TAU request message, then the eNodeB would have to include the cell identity in the S1AP which carries the TAU request to the MME.

In some embodiments of the method of selecting tracking area(s) to be used as primary tracking area(s) a hierarchy of TAs, e.g. primary TA(s), secondary TA(s), tertiary TA(s), etc. is employed. Different selection conditions would be used for the different hierarchical levels. The serving MME could then (when deemed appropriate) utilize this hierarchy in its paging strategy, e.g. by first paging the UE in the primary TA(s), then (if needed) in the secondary TA(s), etc. and finally (if needed) in the remaining TAs in the TA list.

In some embodiments of the method of gathering information about usage of tracking areas for a user equipment, the list of tracking areas (tracking area identifiers) maintained in the user equipment consists of only a single TA (as allocated by the serving MME). In this manner, the movements of the user equipment may be more closely followed (or tracked). In this manner, more detailed information about usage of tracking areas for a user equipment may be obtained.

Expressed differently, to improve the statistics that constitutes the input data to the primary TA selection algorithm the MME may temporarily choose to always allocate only a single TA in the TA list of a subscriber. As a consequence, every movement in and out of the TA will be visible to the MME as a TAU, which in turn improves, or speeds up, the learning of suitable primary TA candidates.

This method could e.g. be used temporarily for new subscribers in order to quickly establish one or more primary TA(s) for the subscriber. Another option is to temporarily use the method when a subscriber exhibits new behavior, which may be discovered e.g. if a primary TA fails to fulfill its purpose too frequently or if the input statistics shows a decline of a primary TA's qualities as a primary TA. Yet an option could be to temporarily use this method periodically in order to now and then retrieve improved input data to either confirm that a primary TA is still a primary TA or that a new TA should be selected instead.

Optionally, the method could be used only in a certain area (part of the PLMN (Public Land Mobile Network) or MME pool coverage area) where the MME is interested in more precise input data.

The method could be triggered from the HSS or an O&M node or by the MME itself. Note that the method is useful only if the MME gathers the input statistics. When the UE gathers the input statistics it always has full overview of the movements and thus the quality of the input data (or the speed with which it could be gathered) would not be improved by allocating TA lists with only a single TA.

With reference to embodiment 2, wherein two types of primary tracking areas or primary tracking area identifiers are used, a more detail description thereof is presented in the following.

Embodiment 1 proposes ways to select a single primary TA for a certain subscriber. As an option, it also suggests that several primary TAs could be selected, but they would all be selected using (more or less—with some restrictions) the same selection algorithm. This is an attractive solution with rather low complexity. However, certain advantages can be achieved by introducing two different types of primary TAs, which would be used for different purposes (in different situations) and which would be selected using different selection algorithms.

The rationale behind this is that one can identify two different purposes of (and corresponding ways to use) a primary TA. Although the overall purpose of the primary TA concept is to reduce the overall signaling load (and thus interference) caused by paging and TAU, there are two different ways to achieve this. One way is to reduce the number of TAUs and the other is to limit the number of TAs involved in each page.

To use a primary TA to reduce the number of TAUs one should identify a TA that is frequently entered by the concerned subscriber and proactively add this TA to the TA list of the UE (i.e. the UE that the concerned subscriber is using) when there is reason to believe that the UE will soon enter the TA, e.g. because the UE is close to it. Another, similar approach is to identify a TA border which is frequently crossed by the UE and use this information to avoid TAUs when the UE crosses this border. Ways to avoid TAU at the border crossing could be to proactively add both the concerned TAs (i.e. the TAs with a mutual, frequently crossed border) to the UE's TA list or to proactively add one of the two TAs when it is confirmed that the UE is located in the other of the two TAs.

To use a primary TA to reduce the number of TAs involved in paging, other selection criteria are preferable. This can be achieved by identifying a TA in which the concerned subscriber is frequently located when paged. Whenever this TA is included in the UE's TA list (and the UE is not known to be in any of the other TAs in the TA list), the MME uses the previously described optimized paging scheme, i.e. it first pages the UE in the identified TA (i.e. the TA in which the UE is often located when paged) and subsequently, in case no response is received from the UE within a certain time, it pages the UE in the remainder of the TAs in the TA list (optionally including the identified TA also in this second page). If this optimized paging scheme is not implemented, an alternative approach is to wait until the subscriber's presence in the identified TA is confirmed and then shrink the TA list of the UE (i.e. the UE the subscriber is using) so that it includes only the identified TA (or possibly the identified TA and one or more neighboring TAs).

Obviously, the primary TA selection criteria for the two above described methods (i.e. respectively avoiding TAUs and limit the page load) are not the same. Many times the same TA (or TAs) could (reasonably well) fulfill both criteria (which is the assumption in embodiment 1), but it may also be common that there is no TA that is suitable for both methods. In these situations embodiment 1 would inevitably result in a suboptimal compromise (or that no primary TA at all fulfills the selection criterion). The conclusion is that it may be beneficial to introduce two types of primary TAs, which would be selected and utilized independently of each other.

Consequently, this embodiment introduces two types of primary TAs. In line with the above discussion, one of the primary TA types is used for reduction of TAUs, whereas the other one is used for reducing the page load. The two types of primary TAs are selected and used independently of each other, using different selection algorithms and different usage strategies. Since they are used independently, they may, depending on the situation, be in use one at a time, simultaneously or none at all. Furthermore, their mutually independent selections may sometimes result in that no primary TA of any type is selected, that only a primary TA of one of the types is selected, that one TA is selected as one of the primary TA types and another TA is selected as the other primary TA type, or that the same TA is selected (by both the independent selection algorithms) as the primary TA of both types.

The embodiment may be elaborated similarly as embodiment 1. Hence, for each of the primary TA types, the mechanisms may be adapted to select a single or multiple primary TAs. If multiple primary TAs (of the same type) are selected, they may be used simultaneously (all or a few at a time), if appropriate in the current situation, or one at a time. Running an independent instance of each selection algorithm per MME pool (i.e. one selection algorithm instance (of each type) selecting among the TAs belonging to one MME pool) is an attractive option.

Embodiment 2 is further comprises two sub-embodiments 2a and 2b. In sub-embodiment 2a it is assumed that the previously described intelligent paging strategy (i.e. first paging in a primary TA (or a group of primary TAs) and then increasing the paging area if needed) is implemented and used. In sub-embodiment 2b it is assumed that no such intelligent paging logic is implemented.

In sub-embodiment 2a, wherein two Primary TA Types are used, the paging procedure may be improved. The primary TA type that is used to reduce the number of TAUS is denoted type 1 primary TA and the primary TA type that is used to reduce the paging load is denoted type 3 primary TA.

As mentioned above there are (at least) two approaches for the selection criterion for type 1 primary TAs. One approach ("type 1 selection criterion A") is that the selection algorithm identifies one or more TA(s) that are frequently entered by the concerned subscriber. The other approach ("type 1 selection criterion B") is that the selection algorithm identifies one or more pair(s) of TAs, whose mutual border is often crossed by the concerned subscriber. With the latter selection criterion, the type 1 primary TAs would always be selected in pairs. Henceforth type 1 primary TAs selected with type 1 selection criterion A are denoted type 1A primary TAs, whereas (pairs of) type 1 primary TAs selected with type 1 selection criterion B are referred to (pairs of) type 1B primary TAs.

As also mentioned above, the different selection criteria are coupled to how the selected type 1 primary TAs are used. A type 1A primary TA is used for proactive inclusion in the TA list of the associated subscriber, when the subscriber is likely to enter the type 1A primary TA soon. This may be when the subscriber is reasonably close to the type 1A primary TA. For such a proactive inclusion to be beneficial the TA list must be compiled such that the UE (that the concerned subscriber is using) can move from its current location to the type 1A primary TA without performing any TAU (i.e. the TAs in the TA list should form a continuous path from the current UE location to the primary TA).

A pair of type 1B primary TAs may be used for proactive inclusion in a TA list in the same way as type 1A primary TAs with the only difference being that the type 1B primary TAs are treated as a pair (i.e. both the TAs of the pair are proactively included in the TA list). In addition, type 1B primary TAs can be used such that if one of the TAs in a type 1B primary TA pair is included in a TA list (e.g. as a result of the regular (non-primary TA) TA list allocation algorithm or because the UE was turned on in the TA) then the other TA in the type 1B primary TA pair may also be proactively included in the TA list. Additional criteria for proactive inclusion of a type 1A or 1B primary TA or a pair of type 1B primary TAs into a TA list may be based on further statistics and may comprise e.g. that the time of day (and/or day of week) is appropriate and/or that the subscriber is located or moving in a certain direction in relation to the type 1A primary TA. Such additional criteria may be used together with a proximity criterion.

To feed the selection algorithm for type 1 (both 1A and 1B) primary TAs with appropriate input data, statistics should be gathered with the purpose of tracking the subscriber's movements. If the MME gathers the input data, this includes recording the subscriber's location during previously mentioned events such as Attach requests, TAUs, UE originated service requests and handovers (Including the TAI in the path switch request from the target eNodeB during handovers would improve the MME's ability to track UE movements through handovers. Even more precise location information to the MME may be the result of a recent agreement in 3GPP to include the cell identity (Enhanced Cell Global Identity, E-CGI) in all mobility related S1AP signaling. Note also that the TAU that the UE always performs immediately after a handover into a TA that is not included in the UE's TA list also provides input data.). If the UE gathers the input data, the subscriber's/UE's movements can be more accurately recorded in terms of dwelling times and border crossings (on TA level or even on cell level if desired).

To feed the selection algorithm for type 3 primary TAs with appropriate input data, statistics on the subscriber's location during pages should be gathered (i.e. aiming to measure the probability for each TA that the subscriber is paged in the TA). Since the subscriber's location is not known for failed (unanswered) pages (irrespective of whether the MME or the UE gathers the statistics), the best available measure is the subscriber's location at answered pages. Hence, the number of page responses and their associated locations represent good input data to gather in either the MME or the UE. (Measuring the subscriber's accumulated relative dwelling time in TA (i.e. the accumulated dwelling time in the TA in relation to the total dwelling time) may often be a reasonably good indirect measure of the probability that the subscriber is paged in the TA, but sometimes the correlation between dwelling time and page probability may be poor, so relying directly on page answers is a more direct measure which in most cases should provide more accurate input data.)

It should be noted that the type 1 and type 3 primary TAs are selected independently of each other, which means that the same TA may well be selected as both type 1 and type 3 primary TA.

Now, turning to sub-embodiment 2b, wherein two Primary TA Types are used and the procedure for paging is not improved.

In this sub-embodiment the primary TA type that is used to reduce the number of TAUs is selected and used in the same way as in sub-embodiment 2a and hence the same primary TA type, type 1 primary TAs (or more precisely type 1A and 1B primary TAs), can be "reused". The primary TA type used for page load reduction in this sub-embodiment is however different from the one in sub-embodiment 2a and is therefore denoted type 2 primary TA.

This sub-embodiment differs from sub-embodiment 2a in how the primary TA type for reducing the paging load is used. Because no intelligent paging strategy is used (i.e. a UE is always paged in all the TAs in its TA list), the paging load is reduced by shrinking the paging area altogether. This is achieved by shrinking the TA list of a subscriber when appropriate and when the primary TA selected for this purpose can be utilized. Hence, when the subscriber is confirmed (e.g. through an Attach, a TAU, page response or UE originated service request) to be located in his/her (or one of his/her) type 2 primary TA(s) many or all of the other TAs in the subscriber's TA list may be removed. Another, more questionable way to use a type 2 primary TA would be to start removing TAs from the TA list as soon as the type 2 primary TA is included in the TA list (e.g. by the regular TA list allocation algorithm), even if the subscriber is not located in (or at least not confirmed to be located in) the type 2 primary TA. For instance, if the UE performs a TAU in a TA which is adjacent to the type 2 primary TA and the regular TA list allocation algorithm builds a new TA list which includes the type 2 primary TA, then a special type 2 primary TA allocation algorithm may kick in and remove all TAs from the TA list (i.e. from the TA list produced by the regular TA list allocation algorithm), except the type 2 primary TA, the TA the UE is currently located in and possibly some other TA(s). The fact that the primary TA type for paging load reduction is used differently in this sub-embodiment than in sub-embodiment 2a (i.e. type 2 primary TAs are used differently than type 3 primary TAs) implies that also its selection criterion (and thus its selection algorithm) must be different from sub-embodiment 2a. Removing other TAs from the TA list when the subscriber is located in a type 2 primary TA is a beneficial strategy only if the subscriber can be expected to be paged before he/she leaves the type 2 primary TA and that this (statistically) happens a sufficient number of times to make the saved page load outweigh the load of the TAU which (almost) inevitably will follow when the subscriber eventually leaves the type 2 primary TA. Hence, a good candidate for a type 2 primary TA is a TA in which the UE is often paged during an "uninterrupted dwelling" (i.e. during a period when the subscriber continuously remains in the TA). Hence, statistics on page responses and location is not enough as input data to the selection algorithm for type 2 primary TAs (and nor is statistics on dwelling times). This statistic has to be complemented with tracking of the subscriber's movements (as described in conjunction with input data gathering for type 1 primary TA selection), so that statistics on number (or probability) of pages during uninterrupted dwelling periods (per TA) can be derived.

Similar to sub-embodiment 2a it should be noted that the type 1 and type 2 primary TAs are selected independently of each other, which means that the same TA may well be selected as both type 1 and type 2 primary TA.

Similarly to embodiment 1, embodiment 2 is not limited to selection a single type 1 or type 2 primary TA (or a single pair of type 1B primary TAs). Selecting multiple primary TAs of each type (or multiple pairs of type 1B primary TAs) is also possible, which may be used in parallel (i.e. simultaneously) or based on location or time of day or current MME pool. Furthermore, all the extensions described for embodiment 1 may be applicable to embodiment 2.

Even though the invention has been described with reference to specific exemplifying embodiments thereof, many different alterations, modifications and the like will become apparent for those skilled in the art. The described embodiments are therefore not intended to limit the scope of the invention, which is defined by the appended claims.

The invention claimed is:

1. A method in a data collection network node for gathering information to be used for identifying at least one of a plurality of different tracking areas as a primary tracking area in which a particular user equipment is most likely to be located, wherein a wireless communication network comprises the data collection network node, the method comprising:
retrieving a tracking area identity;
registering information about usage of a tracking area identified by the retrieved tracking area identity;
determining a measure for the user equipment being located in the tracking area identified by the retrieved tracking area identity, wherein the measure is based on one or more of the probability of receiving a page response from the user equipment if the user equipment is located in that tracking area, the time spent by the user equipment in the tracking area, and tracking area border crossings by the user equipment; and
selecting said tracking area identity as the identity of said at least one primary tracking area, if the measure exceeds a threshold;
wherein the data collection network node comprises a network node that manages the mobility of the user equipment; and
wherein the retrieved tracking area identity is received from a radio network node in the wireless communication network.

2. The method according to claim 1, further comprising sending or receiving a service or tracking area update request, or a page response, and wherein the tracking area identity is retrieved from or in conjunction with that service or tracking area update request or page response.

3. The method according to claim 1, wherein the information about usage comprises information about one or more of: cell dwelling time, tracking area dwelling time, number of page responses, service requests, tracking area entrances, tracking area border crossings, identities of camped cells, and identities of tracking areas visited.

4. The method according to claim 3, wherein at least some of said information comprises information about usage during one or more different periods of time.

5. The method according to claim 1, further comprising sending the registered information to a first network node in the wireless communication network that is configured to use the registered information for selecting said at least one primary tracking area.

6. The method according to claim 1, wherein the threshold is preconfigured or dynamically determined based on at least one of said probability, time spent, and tracking area border crossings.

7. The method according to claim 1, wherein the data collection network node is temporarily configured to assign only one tracking area to a user equipment in response to a tracking area update request from the user equipment.

8. The method according to claim 1:
wherein the wireless communication network further comprises a core network node;
wherein selecting the tracking area identity as the identity of said at least one primary tracking area is performed based on the registered information; and
wherein the method further comprises sending the tracking area identity to the core network node.

9. A method in a data collection network node for gathering information to be used for identifying at least one of a plurality of different tracking areas as a primary tracking area in which a particular user equipment is most likely to be located, wherein a wireless communication network comprises the data collection network node and a core network node, the method comprising:
retrieving a tracking area identity;
registering information about usage of a tracking area identified by the retrieved tracking area identity;

selecting the tracking area identity as the identity of said at least one primary tracking area, based on the registered information;

sending the tracking area identity to the core network node; and sending the registered information to the core network node;

wherein the data collection network node is said user equipment; and wherein said selecting comprises:

determining a measure for the user equipment being located in the tracking area identified by the retrieved tracking area identity, wherein the measure is based on one or more of the probability of receiving a page response from the user equipment if the user equipment is located in that tracking area, the time spent by the user equipment in the tracking area, and tracking area border crossings by the user equipment; and selecting said tracking area identity as the identity of said at least one primary tracking area if the measure exceeds a threshold.

10. A data collection network node configured to gather information to be used for identifying at least one of a plurality of different tracking areas as a primary tracking area in which a particular user equipment is most likely to be located, wherein a wireless communication network comprises the data collection network node and a core network node, the data collection network node comprising:

a retrieving unit configured to retrieve a tracking area identity; and a processing unit configured to:

register information about usage of a tracking area identified by the retrieved tracking area identity;

select the tracking area identity as the identity of said at least one primary tracking area, based on the registered information;

send the tracking area identity to the core network node; and send the registered information to the core network node;

wherein the data collection network node is said user equipment; and wherein to select the tracking area identity as the identity of said at least one primary tracking area, the data collection network node is configured to:

determine a measure for the user equipment being located in the tracking area identified by the retrieved tracking area identity, wherein the measure is based on one or more of the probability of receiving a page response from the user equipment if the user equipment is located in that tracking area, the time spent by the user equipment in the tracking area, and tracking area border crossings by the user equipment; and select said tracking area identity as the identity of said at least one primary tracking area if the measure exceeds a threshold.

11. A method in a core network node for selecting at least one of a plurality of different tracking areas as a primary tracking area in which a particular user equipment is most likely to be located, wherein a wireless communication network comprises the core network node and the user equipment, the method comprising:

retrieving information about one or more tracking areas for the user equipment;

determining a measure for the user equipment being located in each of the one or more tracking areas, wherein the measure is based on one or more of the probability of receiving a page response from the user equipment if the user equipment is located in the tracking area, the time spent by the user equipment in the tracking area, tracking area entries, and tracking area border crossings by the user equipment;

selecting at least one of said one or more tracking areas as a primary tracking area, if the measure associated with that tracking area exceeds a first threshold; and selecting at least one of said one or more tracking areas as a secondary tracking area, if the measure exceeds a second threshold, wherein the second threshold is determined based on the retrieved information.

12. The method according to claim 11, wherein the information comprises cell dwelling times, tracking area dwelling times, page response statistics, service request statistics, tracking area entrances, tracking area border crossings, camped cells, tracking areas visited by the user equipment, or a combination thereof.

13. The method according to claim 12, wherein at least some of said information comprises information about usage during one or more different periods of time.

14. The method according to claim 11, wherein the first threshold is determined based on the retrieved information.

15. The method according to claim 11, wherein the core network node comprises a Mobility Management Entity (MME), wherein the measure is based only on information relating to tracking areas belonging to the same MME pool as the user equipment is currently located in, and wherein the same MME pool comprises one or more MMEs.

16. The method according to claim 11, wherein said first threshold is set based on reducing the number of tracking area updates sent in said wireless communication network, and on reducing the number of tracking areas or the number of cells involved in paging.

17. The method according to claim 11, wherein said first and second thresholds are each set based on reducing the number of tracking area updates sent in said wireless communication network, and on reducing the number of tracking areas or the number of cells involved in paging.

18. The method according to claim 11, wherein said at least one primary tracking area and said at least one secondary tracking area are selected by comparing measures of usage with different thresholds, whereby the first threshold is different from the second threshold.

19. A core network node configured to select at least one of a plurality of different tracking areas as a primary tracking area in which a particular user equipment is most likely to be located, wherein a wireless communication network comprises the core network node and the user equipment, the core network node comprising:

a retrieving unit configured to retrieve information about one or more tracking areas for the user equipment; and a processing unit configured to:

determine a measure for the user equipment being located in each of the one or more tracking areas, wherein the measure is based on one or more of the probability of receiving a page response from the user equipment if the user equipment is located in the tracking area, the time spent by the user equipment in the tracking area, tracking area entries, and tracking area border crossings by the user equipment; and select at least one of said one or more tracking areas as a primary tracking area, if the measure associated with that tracking area exceeds a first threshold; and select at least one of said one or more tracking areas as a secondary tracking area, if the measure exceeds a second threshold, wherein the second threshold is determined based on the retrieved information.

20. A method in a network node that manages a list of tracking area identities for paging a user equipment, wherein at least one of the tracking area identities in the list comprises the identity of a primary tracking area, wherein each tracking area identified by the tracking area identities in the list is associated with at least one cell served by a radio network node that is managed by the network node, wherein a wireless communication network comprises the network node, the radio network node, and the user equipment, and wherein at least one of the tracking area identities in said list comprises the identity of a secondary tracking area, the method comprising:

paging the user equipment in at least one cell associated with said at least one primary tracking area; and if no response is received from the user equipment responsive to said paging:

paging the user equipment in cells associated with a set of tracking area identities that are selected among the tracking area identities in said list;

paging the user equipment in at least one cell associated with said at least one secondary tracking area.

21. The method according to claim 20, wherein each tracking area identity in the set of tracking area identities is different from said at least one tracking area identity that identifies at least one primary tracking area.

22. The method according to claim 20, wherein at least one of the primary tracking area is used during a first period of time and the secondary tracking area is used during a second period of time, wherein the first and second periods of time are configured to be overlapping, non-overlapping, or partly overlapping.

23. The method according to claim 11, wherein the retrieved information is included in subscriber information, wherein the subscriber information comprises information about what one or more tracking areas are associated with the user equipment according to a subscription agreement.

\* \* \* \* \*

UNITED STATES PATENT AND TRADEMARK OFFICE
CERTIFICATE OF CORRECTION

| | | |
|---|---|---|
| PATENT NO. | : 8,670,342 B2 | Page 1 of 1 |
| APPLICATION NO. | : 13/140262 | |
| DATED | : March 11, 2014 | |
| INVENTOR(S) | : Norefors et al. | |

It is certified that error appears in the above-identified patent and that said Letters Patent is hereby corrected as shown below:

In the Drawings:

In Fig. 7, Sheet 4 of 5, in Box "720", in Lines 2-3, delete "Receiving unit" and insert -- Retrieving unit --, therefor.

In the Specification:

In Column 5, Line 67, delete "area, and" and insert -- area. --, therefor.

In Column 23, Line 32, delete "TAUS" and insert -- TAUs --, therefor.

In Column 24, Line 11, delete "1 B)" and insert -- 1B) --, therefor.

Signed and Sealed this
Twenty-second Day of July, 2014

Michelle K. Lee
*Deputy Director of the United States Patent and Trademark Office*